US011376878B2

(12) United States Patent
Navas et al.

(10) Patent No.: US 11,376,878 B2
(45) Date of Patent: Jul. 5, 2022

(54) RENDERING SYSTEM ENERGY RECOVERY

(71) Applicant: Hewlett-Packard Development Company, L.P., Spring, TX (US)

(72) Inventors: Borja Navas, Sant Cugat del Valles (ES); Albert Franco Morera, Sant Cugat del Valles (ES); Volker Seidel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 188 days.

(21) Appl. No.: 16/959,769

(22) PCT Filed: Feb. 6, 2018

(86) PCT No.: PCT/US2018/017073
§ 371 (c)(1),
(2) Date: Jul. 2, 2020

(87) PCT Pub. No.: WO2019/156654
PCT Pub. Date: Aug. 15, 2019

(65) Prior Publication Data
US 2020/0361224 A1    Nov. 19, 2020

(51) Int. Cl.
*B41J 29/377* (2006.01)
*B29C 64/118* (2017.01)
(Continued)

(52) U.S. Cl.
CPC .......... *B41J 29/377* (2013.01); *B29C 64/118* (2017.08); *B41J 11/002* (2013.01);
(Continued)

(58) Field of Classification Search
CPC .... B41J 29/377; B41J 11/002; B41J 11/0022; B29C 64/118; B29C 64/295;
(Continued)

(56) References Cited

U.S. PATENT DOCUMENTS 5,020,244 A    6/1991  Smith
6,463,674 B1  10/2002  Meyers et al.
(Continued)

FOREIGN PATENT DOCUMENTS

CN    101200130    6/2008
CN    202357586    8/2012
(Continued)

OTHER PUBLICATIONS

Yu Zhiming et al.Hydraulic and Pneumatic Transmission,Aug. 31, 2017, pp. 320-321, Beijing Institute of Technology Press.

*Primary Examiner* — Bradley W Thies
(74) *Attorney, Agent, or Firm* — HP Inc. Patent Department

(57) ABSTRACT

A rendering apparatus, in an example, comprises a rendering zone disposed between a rendering material deposition head and a substrate, a processing module to process the rendering material, a heat exchanger to transfer heat from the processing module to air to be re-distributed to the rendering zone, a distribution system for re-distributing heated air to the rendering zone, a valve located between the heat exchanger and the rendering zone, a temperature sensor located in the rendering zone to detect a temperature of the heated air that is re-distributed to the rendering zone, and a control module to adjust a temperature of the rendering zone by controlling an aperture of the valve using a feedback signal received from the temperature sensor.

15 Claims, 3 Drawing Sheets

(51) Int. Cl.
  *B41J 11/00* (2006.01)
  *F26B 21/00* (2006.01)
  *B33Y 10/00* (2015.01)
  *B33Y 50/02* (2015.01)
  *B33Y 80/00* (2015.01)

(52) U.S. Cl.
  CPC ......... *B41J 11/0022* (2021.01); *F26B 21/004* (2013.01); *B33Y 10/00* (2014.12); *B33Y 50/02* (2014.12); *B33Y 80/00* (2014.12)

(58) Field of Classification Search
  CPC ....... F26B 21/004; B33Y 10/00; B33Y 50/02; B33Y 80/00; Y02P 70/10
  See application file for complete search history.

(56) References Cited

U.S. PATENT DOCUMENTS

| | | | |
|---|---|---|---|
| 8,523,345 | B2 | 9/2013 | Suzuki et al. |
| 8,749,603 | B2 | 6/2014 | Thayer |
| 8,967,786 | B2 | 3/2015 | Velasco et al. |
| 9,163,876 | B2 | 10/2015 | Chiwata et al. |
| 9,387,698 | B2 | 7/2016 | Leighton et al. |
| 2003/0206820 | A1* | 11/2003 | Keicher ................ B23K 26/32 419/9 |
| 2013/0328989 | A1 | 12/2013 | Thayer et al. |
| 2015/0197063 | A1 | 7/2015 | Shinar |
| 2017/0129184 | A1 | 5/2017 | Buller |
| 2017/0297348 | A1 | 10/2017 | Smith |

FOREIGN PATENT DOCUMENTS

| | | |
|---|---|---|
| CN | 102673159 | 9/2012 |
| CN | 103481659 | 1/2014 |
| CN | 203543342 | 4/2014 |
| CN | 204278772 | 4/2015 |
| CN | 204451511 | 7/2015 |
| CN | 106739468 | 5/2017 |
| WO | WO-2017148540 A1 | 9/2017 |
| WO | WO-2017167356 | 10/2017 |
| WO | WO-2017182072 A1 | 10/2017 |

\* cited by examiner

RENDERING SYSTEM ENERGY RECOVERY

BACKGROUND

In an example rendering apparatus, such as a large format or 3D printer, a rendering material is deposited onto a substrate by a rendering material deposition head. The rendering material can be cured on the substrate using heat due to the potential size of the prints and/or high throughput.

The generation of heat to apply during and after rendering can result in high energy consumption.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

According to an example, there is provided a rendering apparatus or device that is able to recover thermal energy for re-distribution within the rendering apparatus. The rendering apparatus may be capable of rendering a two-dimensional image or a three-dimensional object. The apparatus and method described re-distributes heated air from a heat exchange unit which is used, for example, to condensate solvent vapours from a curing processor post-processing a rendering material. The re-distributed heated air can be used to heat a rendering or printing zone and/or a processing zone (e.g., a zone within a pre-processing module and/or a post-processing module). To ensure that a temperature inside the rendering zone and/or processing zone is maintained, a closed-loop control module may monitor the temperature, using readings from a sensor within the rendering zone or processing zone, and may adjust a valve and/or heating element as appropriate. In an example, the valve can be a bypass valve or a feedback valve, and reference to one should be considered interchangeable with the other. The valve can be used to vent heated air, and the heating element can be used to further heat the heated air.

It should be understood as pre-processing module, any module wherein the rendering material is processed prior to its rendering such as, e.g., a pre-heating module. Moreover, a post-processing module is to be understood as a module wherein the rendering material is processed once it has undergone a rendering process, e.g., a curing module.

Figure 1:
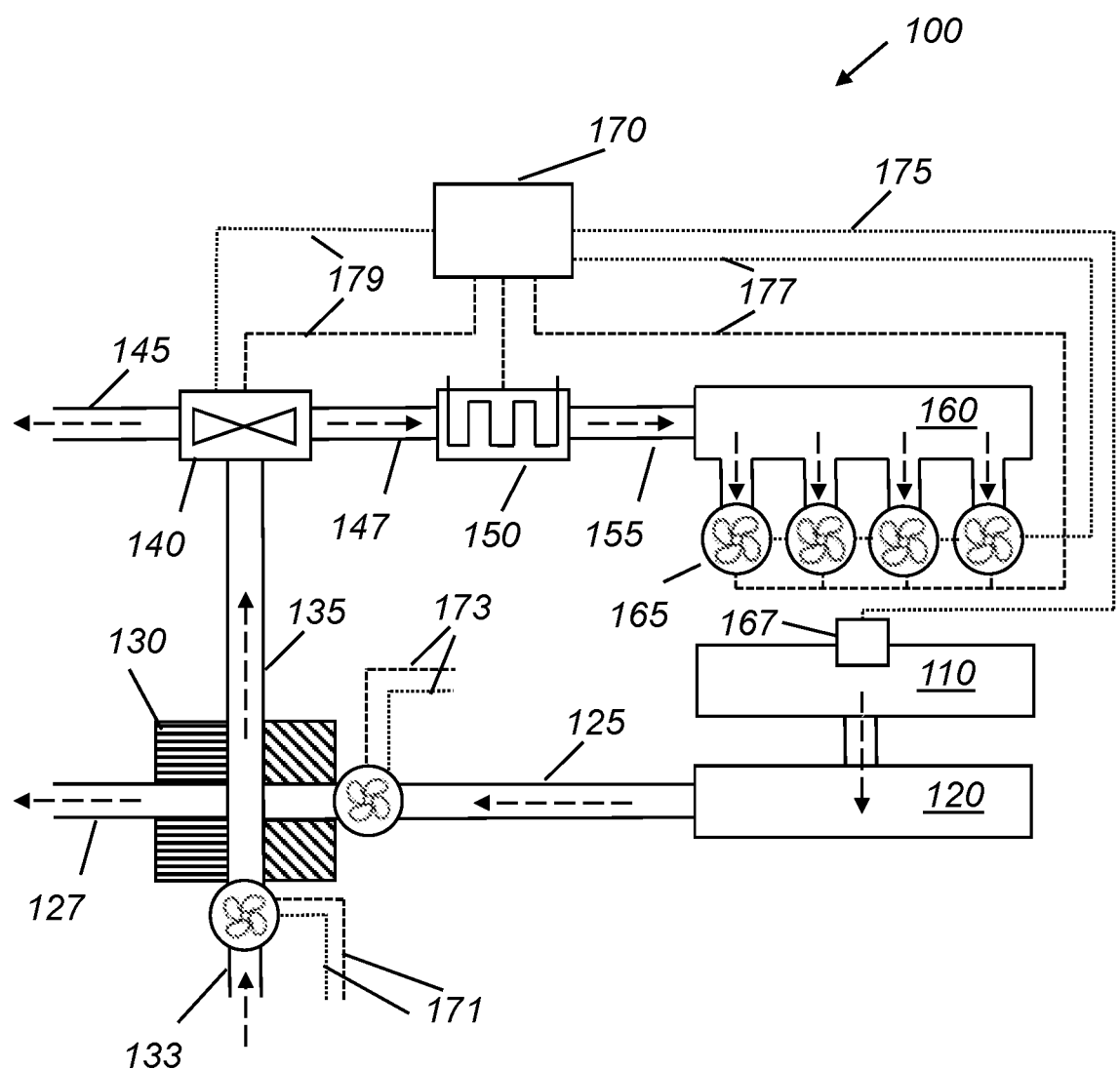
FIG. 1 is a schematic showing a rendering apparatus according to an example.

FIG. 1 shows a rendering apparatus 100 according to an example. The rendering apparatus may be a large format printer. The rendering apparatus or device comprises a rendering module 110, a module 120, which can be a curing module for example, a heat exchanger 130 and a regeneration system. The regeneration system comprises a distribution system arranged to allow airflow to flow between different regions within the rendering apparatus. In an example, the airflow can comprise combinations of fluids, such as air and vapors, air and nitrogen (that may be used for cooling for example) and so on. The distribution system is coupled to the heat exchanger and a plurality of regions within the rendering device. The distribution system comprises pipes, ducts, or conduits and one or more fans to assist airflow throughout the rendering apparatus. The distribution system is arranged to re-distribute heated air to a rendering zone.

The rendering module 110 is arranged within the rendering zone or printing zone. The rendering zone can comprise a rendering material deposition head or printhead, to selectively deposit rendering material onto a substrate. The rendering module is disposed between the rendering material deposition head and the substrate. The rendering material deposition head is arranged to deposit rendering material onto the substrate. The rendering material may comprise solvents. The rendering material may be deposited in liquid form onto the substrate. The substrate may comprise a solid material, such as a paper-based medium, a powder, or a plastic medium. A support can be used to support the substrate and/or to transport the substrate from the rendering zone to a curing zone or impinging sub-system.

The curing module 120 is arranged within the curing zone and cures rendering material that is deposited onto the substrate. The curing module may be located adjacent the rendering module. The curing zone may have a temperature of approximately 90-120° C. The curing zone may comprise heating elements or heaters and fans to assist curing the rendering material. A heater may comprise an electric resistance heater. The fans are arranged to provide active circulation of the heated air in the curing zone. Rendering material that has been deposited onto the substrate is cured on the substrate in the curing zone. The air or vapour within the curing zone may become saturated with solvents and can be exhausted from the curing zone through a conduit 125 coupling the curing module to the heat exchanger. Heated air is replenished from the regeneration system to aid the curing process. As such, the heat exchanger 130 is coupled to an exhaust of the curing module. The air exhausted from the curing module may have a temperature of approximately 90-120° C. A fan may be provided within the exhaust duct 125 to assist airflow from the curing module to the heat exchanger.

The heat exchanger 130 is arranged to transfer heat from the curing module to air to be re-distributed to the rendering zone. The heat exchanger is arranged to extract solvent laden vapours from the rendering apparatus and at the same time to heat clean air entering the rendering apparatus. In an example, clean air is air that does not comprise solvents or waste vapours from the rendering and curing process, i.e. clean air can be dry air having with no condensates therein.

One or more extraction fans may be provided in or adjacent the heat exchanger or within the conduits connecting the heat exchanger to the different areas of the rendering apparatus. The one or more extraction fans may be electrically driven and/or controlled by a control module 170. The extraction fans are arranged to assist airflow through the heat exchanger. Ambient air at approximately 15-35° C. can enter the heat exchanger through an inlet 133. The ambient air entering the inlet can be heated by the exhausted air from the curing module as the ambient air flows through the heat exchanger, since heat is transferred from the hot exhaust air to the ambient air. The ambient air and hot exhaust air do not mix. The exhaust air can flow through the heat exchanger and can be expelled via an outlet 127. The exhaust air may be expelled at a temperature of approximately 40-50° C. The exhaust air may be expelled directly into the atmosphere, since solvents are condensed from the exhaust air via the heat exchanger, thereby cleaning the exhaust air. Alternatively, the exhaust air may be expelled from the heat exchanger directly into an extraction system for further treatment or other method of safe disposal, for example to remove excess heat remaining in the exhausted air. The heat exchanger acts to filter or condensate solvents from the exhaust vapours, which may be collected in condensation trap for safe removal and onward disposal.

The ambient air that flows through the heat exchanger is heated by the exhaust air which also flows through the heat exchanger. The heated air leaves the heat exchanger via an outlet 135 which couples the heat exchanger to other regions of the rendering apparatus. The heated air may have a temperature of approximately 40-50° C. The heated air is fed into a regeneration system. As such, thermal energy can be transferred to heat clean air (for flow out of the heat exchanger) and back into the regeneration system.

The heat exchanger may form part of the regeneration system. The regeneration system is arranged to recover waste or excess thermal energy from the rendering and curing process. The recovered thermal energy can be re-used, recycled or regenerated for further use within the rendering apparatus. The heated air can be used to pre-heat a particular region or regions of the rendering apparatus. The extent of the pre-heating may be controlled by varying relative flow rates of the hot exhaust air and ambient air through the heat exchanger.

The regeneration system comprises a valve 140. The valve 140 may comprise a three-way by-pass valve. The by-pass valve is located between the heat exchanger and the rendering zone, i.e. is in fluidic communication between the heat exchanger and the rendering module such that heated air from the heat exchanger passes through the by-pass valve before being distributed to the rendering module. Heated air can be supplied via the outlet conduit 135 from the heat exchanger to the by-pass valve. The heated air flowing into the rendering apparatus from inlet 133 is clean air (without solvents). The heated air can flow through the distribution system to the by-pass valve. The by-pass valve may be electrically operated and controlled by the control module 170. The heated air is diverted at the by-pass valve either towards a regenerator inlet manifold 160 in the rendering zone, or towards an outlet 145, or the heated air is split between both. Under control of the control module 170, the by-pass valve can be operated to divert all or some of the heated air to different regions of the rendering apparatus. The by-pass valve outlet 145 provides a conduit for excess heated air to be expelled or escape from the rendering apparatus. Heated air leaving the valve outlet 145 is clean air. The heated air leaving the valve outlet 145 has no solvents or other noxious vapours from the rendering and curing processes. The by-pass valve may be operated to release heated air from the rendering apparatus in order to maintain a homogeneous or pre-determined temperature of the rendering apparatus. The by-pass valve may be operated to divert heated air towards the regenerator inlet manifold 160.

The regenerator inlet manifold or fan assembly 160 comprises a plurality of fans. The fans may be electrically operated and serve to distribute the heated air throughout the rendering zone. The plurality of fans may be electrically operated by the control module 170. The fans may operate together or individually to distribute heated air throughout the rendering zone. The control module may operate each of the fans at different speeds or revolutions per minute in order to control the rate of flow of air (and hence heat) within the rendering zone. The regeneration inlet manifold can pre-heat the rendering zone and/or a rendering material deposition head or printhead prior to the rendering process.

The regeneration system may comprise a heating element or heater 150 to selectively supply heat to the heated air. The heating element is arranged to heat air flowing through the distribution system to increase the temperature of the air. A heater may be provided in the outlet conduit 147 from the by-pass valve to further heat clean air. The heater can add thermal energy to the heated air. The provision of a heater in the distribution system or ducting directly supplies thermal energy to air flowing through the ducting and heater, which may be for example a circular heater to fit within the ducting. The heated air flowing through the inlet conduit 147 to the heater 150 may have a lower temperature than heated air flowing through an outlet conduit 155 from the heater 150. A plurality of heaters may be provided throughout the regeneration ducts 147, 155 or elsewhere within the rendering apparatus. The one or more heaters can be electrically operated by the control module 170.

According to an example, the valve 140 can comprise three ports. A first port can be associated with the processing zone, a second port can be fluidly communicated to the rendering zone, and a third port can be fluidly communicated to an air release duct thereby allowing excess heat to be released from the distribution system towards an air release module. In an example, the air release duct may be open to ambient air. The air release duct may also be fluidly connected to an air-cooling mechanism. The valve may further be connected to an air supply (e.g. at ambient temperature, open to ambient, or any temperature lower than the heated air) and can inject air at such a lower temperature to the distribution system.

According to an example, a heating element can be added to the ducting to compensate for warm-up cycles and cold-climate scenarios, while a by-pass valve allows control of the amount of heat that the system is recovering. This allows for a de-coupling of the printing zone temperature from the curing zone and heat exchanger condensation sub-systems.

The heated air can be re-distributed within the rendering apparatus to the rendering zone. The heated air is clean air for curing rendering material deposited onto the substrate. The substrate and rendering material deposited thereon are then transported to the curing zone to cure the rendering material, i.e. evaporate liquids within the rendering material to fix the rendering material onto the substrate. The curing zone heats the rendering material to dry or cure it using one or more heaters. The heated air within the curing zone may be further heated via thermal energy from the heaters. One or more fans may be provided within the curing zone or impinging sub-system to assist drying or curing. As the rendering material dries or cures the solvent vapours are collected in the air within the curing zone. The solvent laden air is extracted through an exhaust conduit 125 of the curing module 120 and the process may be repeated as necessary. As such, heated air from the curing module is cleaned via the heat exchanger and thermal energy extracted for re-use heating clean ambient air entering the rendering apparatus.

The control module 170 (or PID controller) is arranged to monitor and adjust the thermal temperature of various regions within the rendering apparatus 100. One or more sensors, such as temperature sensors can be located throughout the rendering apparatus. A temperature sensor may be provided within the rendering zone to read a temperature inside the rendering module, or to detect a temperature of the heated air that is re-distributed to the rendering zone. The temperature sensor may be a thermistor or thermocouple. The one or more sensors are arranged to read the temperature of the region within which they are located. As such, the sensors provide temperature readings from within the rendering apparatus and feed the temperature readings back to the control module. The control module therefore monitors the temperature within the rendering apparatus. The control module is arranged to selectively adjust a temperature using a feedback signal received from the temperature sensor. This may be achieved by the control module operating one or more valves, heaters, and/or fans throughout the rendering apparatus. For example, the control module 170 can operate the valve 140 to release excess heat before it is re-distributed to the rendering zone. Thus, clean heated air can be exhausted from the rendering apparatus to remove excess thermal heat from the system. Alternatively, the control module 170 can operate the valve 140 to cause heated air to be distributed to the rendering zone. As such, the control module may provide a closed-loop control system for maintaining a determined temperature in the rendering apparatus.

In an example, the control module can be provided with pre-determined temperatures or operating temperatures for each physical element, such as the rendering module or rendering material deposition head, or zone or region within the rendering apparatus. The control module may comprise instructions to maintain the temperatures at each physical element or within each zone at a pre-determined operating temperature. The control module can adjust the actual temperature of a zone or region based on the feedback signals received from the sensors. Suitable wiring 171, 173, 175, 177, 179, power lines or communication lines can be provided allowing the control module to communicate with the various elements (valves, fans, heaters, sensors) within the system.

According to an example, if a temperature sensor in the rendering zone provides a temperature reading to the control module which is outside of a pre-determined threshold, the control module may operate the by-pass valve 140 and/or heater 150 and/or fan speeds to bring the temperature of the rendering zone back within an acceptable range. For example, if a detected temperature within the rendering zone is too high, the control module may open the by-pass valve 140 to vent excess thermal energy through conduit 145 from the system. As such, the control module controls the re-distribution of thermal energy throughout the rendering apparatus in order to maintain acceptable operating parameters within the different regions.

According to an example, the control module may determine a future operating temperature of a physical element or region, or determine that a temperature is about to exceed a threshold level. Responsive to this determination the control module may cause the distribution system to re-distribute heated air as appropriate.

Figure 2:
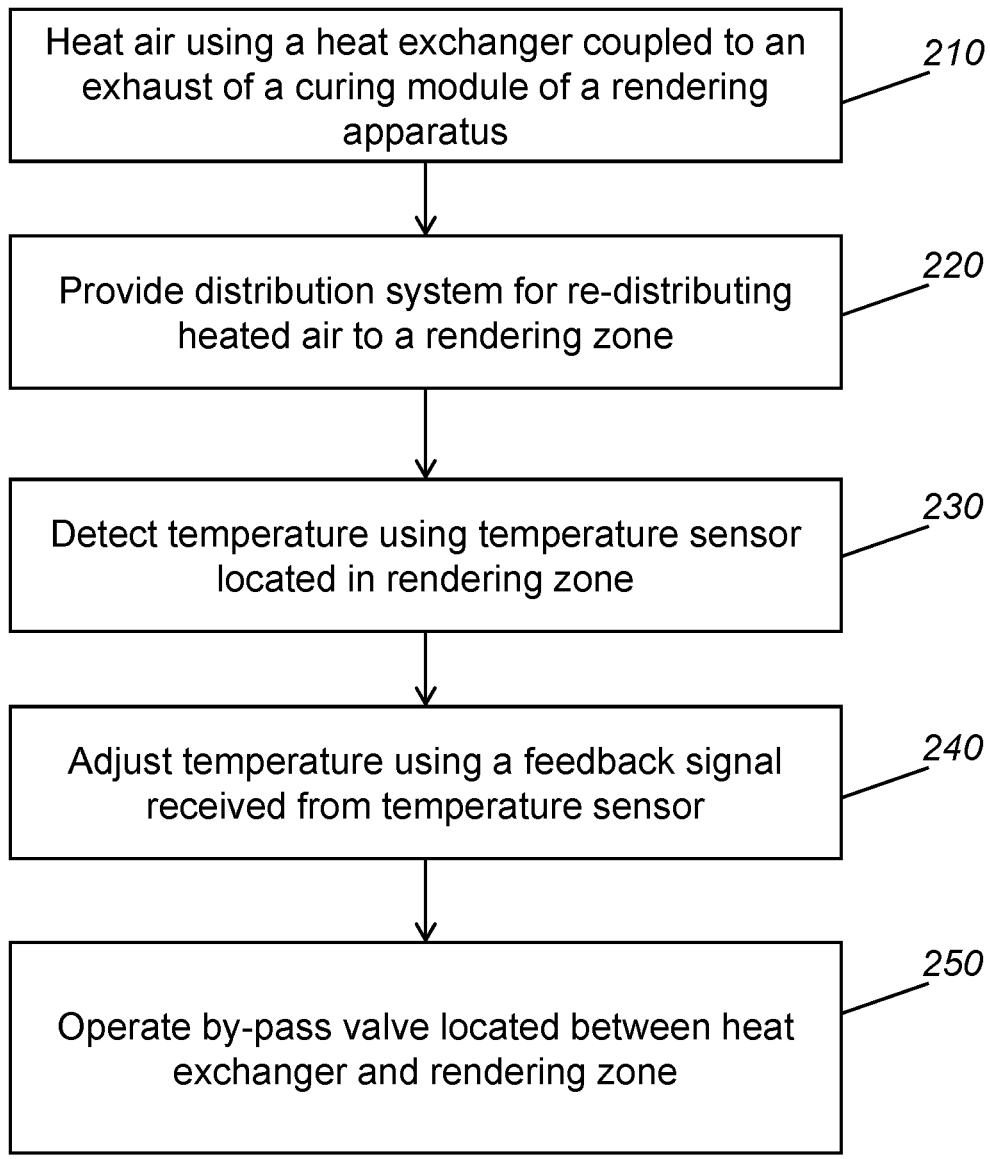
FIG. 2 is a flow chart of a method for adjusting a temperature of heated air and operating a valve according to an example.

FIG. 2 is a flow chart showing a method for adjusting a temperature within a rendering apparatus according to an example. At block 210 air is heated using a heat exchanger coupled to an exhaust of a curing module of a rendering device, to generate heated air. At block 220 a distribution system is provided for re-distributing heated air to a rendering zone. At block 230 a temperature of the rendering zone is detected using a temperature sensor located in the rendering zone. At block 240 a temperature of the rendering zone is adjusted using a feedback signal received from the temperature sensor. In order to adjust the temperature, at block 250 a by-pass valve, located between the heat exchanger and the rendering zone, is operated. For example, a port on the valve can be opened in order to release excess heat (in the form of heated air) so that it is not re-distributed to the rendering zone. Alternatively, if the temperature detected in the rendering zone is below a threshold level, the valve can be operated in order to re-distribute heated air into the rendering zone, whereby to increase the temperature therein.

A homogeneous temperature may be maintained across the rendering zone. Heated air may further be re-distributed to a curing zone. A heating element may selectively supply heat to the heated air and/or at least one fan may be operated to re-distribute the heated air. The method may comprise adjusting the temperature of air within the system by operating both the by-pass valve and a heating element at the same time. The method may further comprise removing condensates from the curing module using the heat exchanger.

In an example, the rendering module 110 may be located adjacent the curing module 120. The exhaust of the curing module can feed directly into the heat exchanger 130. A valve 140 is located adjacent the heat exchanger such that heated air from the heat exchanger feeds directly into the valve. The valve receives clean heated air from the heat exchanger. The clean heated air can be heated using a heater 150 before it is re-distributed back to the rendering module. The location of the valve between the heat exchanger and the rendering module is such that when the valve is operated to release excess heat from the system, clean air is expelled from the system, i.e. a clean exhaust. Air containing solvents is not re-distributed back into the system but instead air containing solvents is safely removed via the heat exchanger. This makes for a rendering apparatus that is more environmentally and user friendly. The arrangement of the elements within the rendering apparatus enables a compact system with less heat being lost through ducting. As such, the arrangement described allows for the safe removal of pollutants from the rendering and curing processes.

According to an example, there is provided an apparatus and method for regenerating part of the otherwise wasted thermal energy of a rendering apparatus, such as a water-based printer or large format printer. With a demand for higher throughput, there is an increase of electric power burden that often customers cannot afford due to electric power supply issues. The efficient management of thermal energy allows an increase in productivity while maintaining electric power usage to within affordable ranges. The energy consumption of the rendering apparatus to maintain a pre-determined temperature within the rendering zone and curing zones may be reduced because heated air or pre-heated air is re-distributed to these regions. The re-use or recovery of thermal energy from the curing process provides a reduction in electric power consumption.

The provision of a heater, such as a circular heater, within ducting of the regeneration system provides a reduction in energy operating costs since thermal energy can be directly applied to the heated air within the distribution system.

The control module enables the individual fan speeds to be adjusted or controlled to provide heated air with more (or less) kinetic energy for the curing or drying process. The regenerator inlet manifold enables a more uniform drying of the rendering material and a more uniform rendering material behaviour. This provides for a better rendered image quality since hot, dry air reaches the substrate or medium with more energy to enhance the drying effect.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
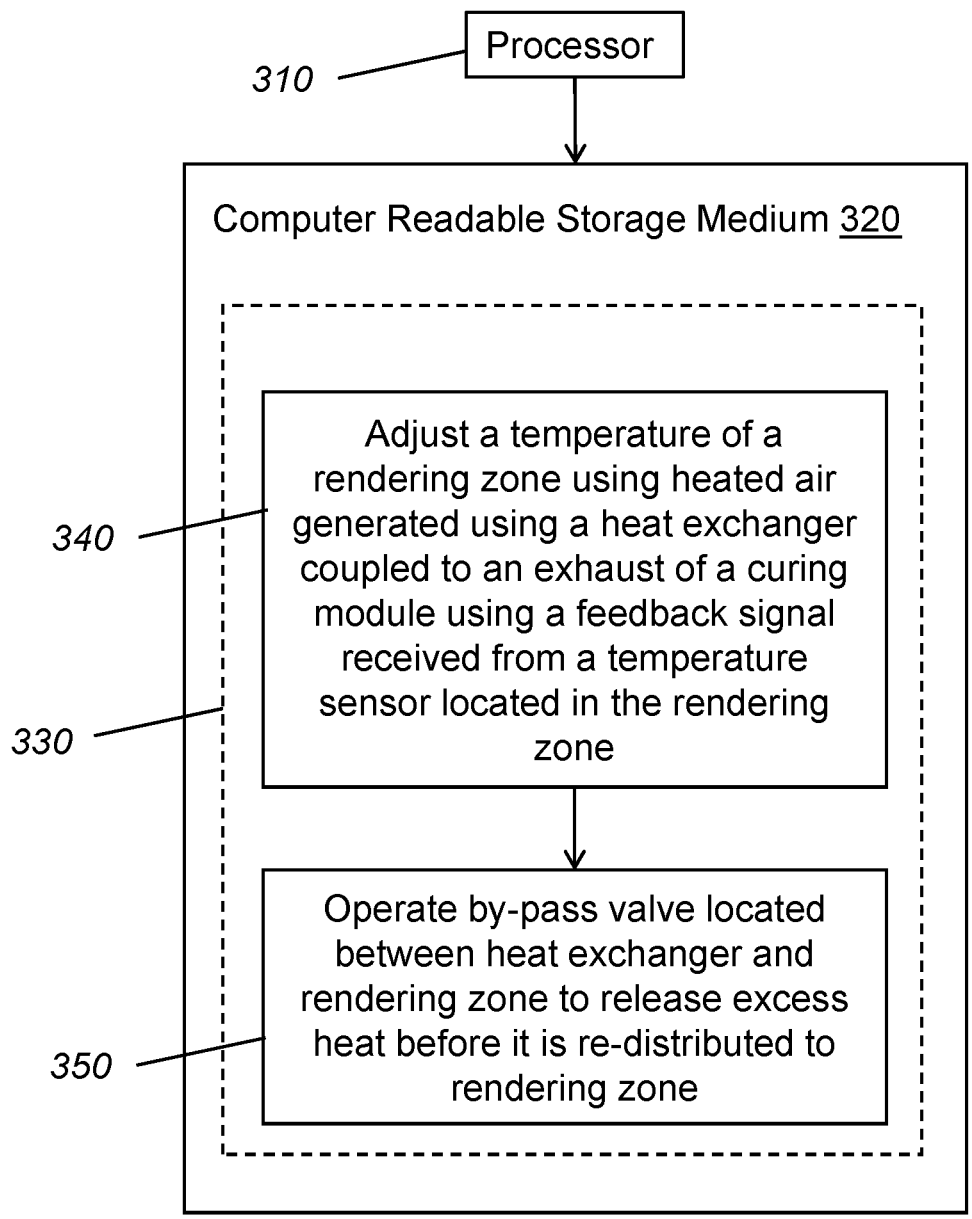
FIG. 3 is a schematic showing a computer readable storage medium having instructions to carry out a method for adjusting a temperature of heated air and operating a valve according to an example.

FIG. 3 shows an example of a processor 310 associated with a computer readable storage medium 320. The computer readable storage medium 320 comprises computer readable instructions 330 which are executable by the processor 310. The instructions 330 comprise:

Instructions 340 to adjust a temperature of a rendering zone using heated air generated using a heat exchanger coupled to an exhaust of a curing module using a feedback signal received from a temperature sensor located in the rendering zone; and Instruction 350 to operate by-pass valve located between heat exchanger and rendering zone to release excess heat before it is re-distributed to rendering zone.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The invention claimed is:

1. A rendering apparatus, comprising:
   a rendering zone disposed between a rendering material deposition head and a substrate;
   a processing module to process the rendering material;
   a heat exchanger to transfer heat from the processing module to air to be re-distributed to the rendering zone;
   a distribution system for re-distributing heated air to the rendering zone;
   a valve located between the heat exchanger and the rendering zone;
   a temperature sensor located in the rendering zone to detect a temperature in the rendering zone; and
   a control module to adjust a temperature of the rendering zone by controlling an aperture of the valve using a feedback signal received from the temperature sensor.

2. A rendering apparatus according to claim 1, wherein the processing module is a pre- or post-processing module, the control module to adjust a temperature of the processing module.

3. A rendering apparatus according to claim 1, wherein the rendering zone comprises a rendering material deposition head, to selectively deposit the rendering material on the substrate.

4. A rendering apparatus according to claim 1, wherein the rendering zone comprises a substrate support device to support the substrate.

5. A rendering apparatus according to claim 1, further comprising a heating element to selectively supply heat to the heated air.

6. A rendering apparatus according to claim 5, wherein the heating element is located in a duct of the distribution system.

7. A rendering apparatus according to claim 1, wherein the distribution system comprises a duct and a fan.

8. A rendering apparatus according to claim 1, wherein the distribution system comprises a manifold of fans located in the rendering zone.

9. A rendering apparatus according to claim 1, wherein the valve comprises three ports, wherein a first port is associated to the processing module, a second port is fluidly communicated to the rendering zone, and a third port is fluidly communicated to an air release duct thereby allowing excess heat to be released from the distribution system.

10. A rendering apparatus according to claim 9, wherein the air release duct is open to ambient air.

11. A rendering apparatus according to claim 9, wherein the air release duct is fluidly connected to an air-cooling mechanism.

12. A rendering apparatus according to claim 9, wherein the valve is connected to an air supply.

13. A method, comprising:
- heating air using a heat exchanger coupled to an exhaust of a processing module of a rendering device, to generate heated air;
- providing a distribution system for re-distributing heated air to a rendering zone;
- detecting a temperature using a temperature sensor located in the rendering zone; and
- adjusting a temperature of the rendering zone using a feedback signal received from the temperature sensor to operate a valve located between the heat exchanger and the rendering zone.

14. A method according to claim 13, further comprising operating a heating element to selectively supply heat to the heated air.

15. A non-transitory computer readable storage medium comprising a set of computer-readable instructions stored thereon, which, when executed by a processor, cause the processor to, in a rendering apparatus:
- adjust a temperature of a rendering zone using heated air generated using a heat exchanger coupled to an exhaust of a curing module using a feedback signal received from a temperature sensor located in the rendering zone; and
- operate a by-pass valve located between the heat exchanger and the rendering zone to release excess heat before it is re-distributed to the rendering zone.

* * * * *